Patented Jan. 17, 1939

2,144,364

UNITED STATES PATENT OFFICE 2,144,364

PRODUCTION AND DEHYDRATION OF ALKALI METAL HYDROXIDES

George Lewis Cunningham, Niagara Falls, N. Y., assignor to The Mathieson Alkali Works, Inc., New York, N. Y., a corporation of Virginia No Drawing. Application November 7, 1936, Serial No. 109,668

7 Claims. (Cl. 23—184)

This invention relates to improvements in the dehydration of alkali metal hydroxides. The invention is of special value and application in the production of anhydrous alkali metal hydroxides. It is however also useful in the concentration of aqueous solutions of alkali metal hydroxides.

In conventional practice, the dehydration of aqueous solutions of alkali metal hydroxides is effected in multiple effect evaporators until the caustic liquor contains about 50% by weight of alkali metal hydroxide and further dehydration is effected in direct fired open evaporating pots until all water is eliminated or until the desired concentration is attained. Such dehydration in open pots entails several disadvantages. Evaporation is slow and thermal efficiency is low. Contamination of the product with impurities originating in the heating gases is almost inevitable. The pots are corroded rapidly and this corrosion also tends to introduce impurities into the product. It has been proposed to substitute vacuum evaporators, at least in part, for such dehydration in pots, but this proposal requires special and expensive apparatus. Further, difficulties due to foaming of the concentrated caustic liquors have not been entirely overcome.

This invention provides an improved process for the dehydration of alkali metal hydroxides which has several important advantages. It is simple, both from the standpoint of operation and from the standpoint of apparatus required. It enables the production of anhydrous, or highly concentrated, alkali metal hydroxides without involving the introduction of any impurities during dehydration. Further, its operation does not subject the apparatus used to severe corrosion incident to conventional dehydration by evaporation.

According to this invention, dehydration of the alkali metal hydroxide is effected by reacting the water containing alkali metal hydroxide with an alkali metal alcoholate of the same alkali metal and an alcohol having not more than four carbon atoms in proportion equivalent to the water present for the production of an anhydrous product or in proportion equivalent to the water to be removed if concentration short of complete dehydration is to be effected, and distilling the alcohol formed by the reaction from the alkali metal hydroxide. The alkali metal alcoholate may be supplied to the reaction as such, or it may with advantage be supplied in solution in alcohol, or its production can be combined with the reaction producing the water containing alkali metal hydroxide to be dehydrated.

Solutions of the alkali metal alcoholate in the corresponding alcohol, useful for this purpose, may be prepared as described in my copending application Serial Number 65,491, filed February 24, 1936 and on which United States Patent No. 2,069,403 was granted February 2, 1937. According to this method of preparation an alcohol having not more than four carbon atoms is reacted with an alkali metal amalgam in the presence of an electrically conducting but non-amalgamating electrode in contact with the alcohol and the amalgam. The electrically conducting but non-amalgamating electrode may be a carbon or graphite electrode, or it may advantageously be a metallic electrode composed of a metal such as cast iron or steel, or it may be a metallic alloy. The electrode should be incapable of being amalgamated by the mercury of the amalgam. The process of this invention may with advantage be combined with that described in my prior application just mentioned to form a cyclic operation, the alcohol recovered from the dehydrated alkali metal hydroxide being reused for generation of the alkali metal alcoholate by reaction with alkali metal amalgam.

The alkali metal content of the alkali metal alcoholate used in practicing the invention is added to the dehydrated alkali metal hydroxide as alkali metal hydroxide. By limiting the proportion of alkali metal alcoholate used not to exceed that equivalent to the water content of the alkali metal hydroxide to be dehydrated, the dehydration is effected without contamination of the product.

The following example, one specific embodiment of the invention, will illustrate the invention:

Example I 1000 parts (by weight) of methyl alcohol is reacted with 0.1% sodium amalgam using a graphite grid as a contact electrode until 69 parts of sodium have been reacted. The resulting methyl alcohol solution of sodium methylate is separated from the amalgam. 108 parts of an aqueous sodium hydroxide solution 50% NaOH are mixed with the separated alcohol solution. The methyl alcohol is distilled off. 174 parts anhydrous sodium hydroxide are recovered.

According to a particularly advantageous embodiment of this invention, dehydration of the alkali metal hydroxide is combined with production of the alkali metal hydroxide, from alkali metal amalgam, by reacting together water, the amalgam in proportion such that its alkali metal content does not exceed that equivalent to the water present, and an alcohol having not more than four carbon atoms, and effecting the reaction in the presence of an electrically conducting but non-amalgamating electrode, and distilling the alcohol from the alkali metal hydroxide. The combined total of alcohol and water present should be sufficient to prevent precipitation of the alkali metal hydroxide prior to separation of the amalgam, or mercury, from the alcohol solution of alkali metal hydroxide.

The following examples of other specific embodiments of the invention will further illustrate the invention:

Example II

A mixture of 174 parts of methyl alcohol and 174 parts of water is reacted with 0.1% sodium amalgam using a steel grid as a contact electrode until 69 parts of sodium have been reacted. The resulting alcohol solution is separated from the amalgam. 174 parts of methyl alcohol are distilled off. 240 parts of an aqueous sodium hydroxide solution 50% NaOH are recovered.

Example III

A mixture of 174 parts of methyl alcohol and 54 parts of water is reacted with 0.1% sodium amalgam using a cast iron grid as a contact electrode until 69 parts of sodium have reacted. The resulting alcohol solution is separated from the amalgam. 174 parts of methyl alcohol are distilled off. 120 parts of anhydrous sodium hydroxide are recovered.

The reaction between alkali metal alcoholate and water to form alcohol and alkali metal hydroxide is, as a chemical reaction, well known. So far as I am aware, however, this reaction has not previously been applied to the dehydration of alkali metal hydroxides.

I claim:

1. In the dehydration of alkali metal hydroxides, the improvement which comprises reacting an alcoholate derived from the same alkali metal and an alcohol having not more than four carbon atoms with the aqueous component of the alkali metal hydroxide and removing the alcohol formed by distillation.

2. In the dehydration of alkali metal hydroxides, the improvement which comprises reacting an alcoholate derived from the same alkali metal and an alcohol having not more than four carbon atoms in solution in an alcohol having not more than four carbon atoms with the aqueous component of the alkali metal hydroxide and removing the alcohol formed by distillation.

3. In the production of anhydrous alkali metal hydroxides, the improvement which comprises reacting, with the aqueous alkali metal hydroxide, an alcoholate derived from the same alkali metal and an alcohol having not more than four carbon atoms, in proportion equivalent to that of the water present in the aqueous alkali metal hydroxide and removing the alcohol formed by distillation.

4. In the dehydration of alkali metal hydroxides, the improvement which comprises reacting, with the aqueous alkali metal hydroxide, an alcoholate derived from the same alkali metal and an alcohol having not more than four carbon atoms, in proportion not exceeding that equivalent to the water present in the aqueous alkali metal hydroxide and removing the alcohol formed by distillation.

5. In the dehydration of alkali metal hydroxides the improvement which comprises reacting an amalgam of the same alkali metal with an alcohol having not more than four carbon atoms in the presence of an electrically conducting but non-amalgamating electrode in contact with the amalgam and the alcohol to form the corresponding alcoholate, reacting the thus formed alcoholate with the aqueous component of the alkali metal hydroxide, and removing the alcohol formed by distillation and returning it to reaction with the amalgam.

6. In the production and dehydration of alkali metal hydroxides, the improvement which comprises reacting together an alcohol having not more than four carbon atoms, an amalgam of the alkali metal and water in the presence of an electrically conducting but non-amalgamating electrode in contact with the amalgam and the alcohol, the amalgam being supplied to the reaction in proportion such that its alkali metal content does not exceed that equivalent to the water present, and thereafter removing the alcohol by distillation.

7. In the production and dehydration of alkali metal hydroxides, the improvement which comprises reacting together an alcohol having not more than four carbon atoms, an amalgam of the alkali metal and water in the presence of an electrically conducting but non-amalgamating electrode in contact with the amalgam and the alcohol, the amalgam being supplied to the reaction in proportion such that its alkali metal content is equivalent to the water present, and thereafter removing the alcohol by distillation.

GEORGE LEWIS CUNNINGHAM.